US008145197B2

(12) United States Patent
Boberg et al.

(10) Patent No.: US 8,145,197 B2
(45) Date of Patent: *Mar. 27, 2012

(54) METHOD AND ARRANGEMENT FOR PROVIDING USER INFORMATION TO A TELECOMMUNICATION CLIENT

(75) Inventors: Christer Boberg, Tungelsta (SE); Anders Lindgren, Alvsjo (SE); Stefan Jormelius, Stockholm (SE); Hans Ake Lindgren, Alvsjo (SE); Justus Petersson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/082,610

(22) Filed: Apr. 8, 2011

(65) Prior Publication Data

US 2011/0295950 A1    Dec. 1, 2011

Related U.S. Application Data

(63) Continuation of application No. 10/598,770, filed on Aug. 23, 2007, now Pat. No. 7,945,250.

(30) Foreign Application Priority Data

Mar. 12, 2004 (SE) .................................. 0400622

(51) Int. Cl.
*H04M 3/42* (2006.01)
(52) U.S. Cl. ................................... 455/414.1; 455/418
(58) Field of Classification Search ............... 455/414.1
See application file for complete search history.

(56) References Cited

OTHER PUBLICATIONS

All references cited in Parent U.S. Appl. No. 10/598,770.

*Primary Examiner* — Charles Shedrick

(57) ABSTRACT

A method and arrangement for providing information to a client from a client access network regarding a requested set of users, at least some of which are connected to other access networks. In response to a client subscription request, the client access network establishes a network subscription with the other access networks. Information updates regarding users in the set are then continuously received and stored in a database of the client access network, whenever the users change their state. In response to a subsequent request for user information from the client, corresponding stored user information is retrieved from the database and sent in a notification to the client.

25 Claims, 3 Drawing Sheets

METHOD AND ARRANGEMENT FOR PROVIDING USER INFORMATION TO A TELECOMMUNICATION CLIENT

RELATED APPLICATIONS

This application is a continuation of U.S. patent application Ser. No. 10/598,770 filed Aug. 23, 2007, the disclosure of which is fully incorporated herein by reference.

TECHNICAL FIELD

The present invention relates generally to a method and arrangement for providing requested information to a telecommunication client regarding a plurality of users. In particular, the invention is concerned with making the communication more efficient in the process of delivering such information to the client.

BACKGROUND OF THE INVENTION AND PRIOR ART

Fixed and mobile communication terminals have so far been used mainly for making voice calls. The service of communicating limited text messages, such as SMS (Short Message Service) messages, is also used extensively by mobile terminals. These are fairly straightforward telecommunication services which use well-established technologies for chiefly circuit-switched single connections. In the standardized communication protocols used for calls between fixed and/or mobile terminals, predefined sets of communication rules and parameters are typically used.

A multitude of new telephony services are now rapidly being developed, which can be employed in particular by the introduction of new communication technologies which provide greater network capacity and higher transmission rates. For example, GPRS (General Packet Radio Service) and CDMA (Wideband Code Division Multiple Access) technologies are currently emerging for enabling wireless telephony services requiring a wide range of data rates and different protocols. The trend today is a move towards packet-switched networks and technologies providing more capacity and flexibility. Further, new sophisticated terminals for communication are also emerging on the market, adapted to handle the new services.

Many of the new services involve real-time transmission of video information as well as audio information, and may further include the transmission of added data representing text, documents, images, audio files and video files in a multitude of different formats and combinations. Such services are generally referred to as "multimedia" services, which term will be used in this description to represent any telephony services that involve the transfer of information in addition to ordinary voice. Another trend is to converge all services on to a single transport mechanism—the Internet Protocol (IP), regardless of the type of access networks and technologies.

Recently, a network architecture called "IP Multimedia Subsystem" (IMS) has been developed by the $3^{rd}$ Generation Partnership Project (3GPP) as an open standard, to give operators of access networks the ability to offer multimedia services in the packet domain. An IMS network, comprising various different network elements to handle the services, can be built above any type of access network and is independent of the access technology used, provided that the access network is able to support the service requirements in terms of bandwidth, QoS (Quality of Service), etc. Hence, IMS is a platform for enabling services based on IP transport, not restricted to any limited specific set of services.

Two important examples of services that can be employed by means of the IMS solution are Instant Messaging (IM) and Presence services. In the IMS solution, presence services are supported by the "Session Initiation Protocol" (SIP) which has been defined by IETF as a generic session management protocol to support a wide range of IP-based services. SIP is purely a signalling protocol for creating, modifying and terminating communication sessions with one or more participants.

Instant Messaging involves the transmission of relatively short messages, e.g. including text, pictures, logos audio/video clips, etc., in "near real-time" between terminals, i.e. with small delays. In this context, "presence" is basically a dynamic and variable state profile of a user, and the presence services basically involve making the presence of a user visible to other users, which furthermore can be used to control other services in turn. This user profile comprises so-called "presence data" basically defining the state of the user and his/her equipment in any predefined respect. Thus, the term "presence" is here given a very broad meaning, and the following "user states" may for example make up the presence data:

A personal status, such as: available, busy, in a meeting, on holiday, etc.

A terminal status, such as: switched on/off, engaged, out of coverage, etc.

The geographic location of the user/terminal.

Terminal capabilities, such as: functionality for SMS, MMS, chat, IM, video, etc.

Terminal selections, such as: call forwarding, language, etc.

Other information, such as: interests, occupations, personal characteristics, moods, personal logos, logo depending on the current mood, etc.

All this information, or any selected parts thereof, is stored in the IMS network, based on so-called "publications of events" received from the network or a user whenever the user changes any of his/her presence data.

According to some services, it is possible for a user to subscribe for selected presence data of one or more other users, e.g. according to a list of users which may be either predefined, such as a phone book, or ad hoc, i.e. temporarily defined. A user subscribing for presence data will hereafter be called a "client". Presence subscriptions are typically provided and handled by a functionality in the IMS of the client's access network.

A client may thus subscribe for presence data according to a list of users during a limited period of time, e.g. 12 hours. In one current implementation, the subscription period may be further extended upon request at any time before expiry. This service may be provided such that during the subscription time period, the client will receive a notification from its IMS network as soon as one of the users in the list has changed his/her presence data, such as having moved to another location. This is often referred to as a "push" behaviour. Alternatively, the client may subscribe for presence data by requesting presence data just once, thus allowing the client to fetch information when needed by request, i.e. a "pull" behaviour. Thus, each time the client requests for presence data, a "one-off subscription" is established, meaning that the subscription is valid for only one such delivery. The mechanisms for these services has been defined by IETF (Internet Engineering Task Force).

A basic procedure according to the prior art for providing presence data of a group of users to a client, will now be described with reference to FIG. 1, which illustrates schematically a typical communication scenario. In this example, a client 100 is wirelessly connected to a mobile access network 102, hereafter called "client access network", and a number of other users 104 are likewise connected to various other mobile access networks IOβa-c. It is assumed that each of the involved networks 104, 106a-c is capable of providing the above-described presence service, e.g. by means of having the IMS solution implemented for each network. This means that each network has the necessary network elements, not further described here, to receive and handle presence data updates by the publication of events from connected users whenever their presence data is changed.

Moreover, the client access network 102 is also adapted to collect updated presence data of the users 104 from the other networks 106a-c, and to provide presence information on the users to the client 100, either by a push behaviour or a pull behaviour as described above. In the IMS solution, a network element called "Resource List Server (RLS)" is used for providing such presence information to the client. Of course, the other networks IOβa-c are also capable of providing presence information in the same manner to their respective clients, i.e. any user 104, in accordance with their subscriptions.

According to a previous solution, when the client 100 makes a one-off subscription request for presence data of a list of users 104, the client access network in turn sends a request, or "poll", for presence data to each of the networks 106a-c to which the concerned users are connected. When the client access network has received responses, or notifications, from all networks 106a-c regarding the present states of the users 104 in the list, a notification is sent to the client containing the desired information on the users 104. This is a pure pull behaviour and can be repeated whenever the client desires to fetch such information.

However, this procedure is complicated and quite time-consuming, since the client access network must issue several requests and wait for notifications from all networks 106a-c, before sending the notification to the client. Moreover, the fetching of data will require considerable amounts of inter-network signalling, especially if many networks are involved. Upon repeated requests, some of the networks may also provide notifications comprising the same information with no updates, as compared to a previous notification. Hence, much of the inter-network signalling triggered by the client's request may even be unnecessary. In addition, when many different operators/networks are involved, standard procedures must be followed not allowing for internal and/or local optimisations.

Furthermore, in the current solution, information on all users in the list is sent to the client in response to his/her request, even if only some or none of the users have made any updates since last time. Therefore, the notification message sent to the client is always "full-sized" regardless of how many users that have actually changed their state since last time. As a result, unnecessary bandwidth for the wireless connection with the client 100 is occupied over a limited radio interface when the notification is sent to the client. In another prior art solution, when the client 100 has an ongoing time-limited subscription for presence data of the users 104, the client access network has in turn established a subscription with each of the concerned networks 106a-c, and thereby automatically receives a notification from any of the networks each time a user in the subscription connected thereto changes his/her presence data. Thereafter, the client access network sends a notification to the client containing the updated presence data, after each notification from the networks, according to a pure push behaviour.

The drawbacks of this solution is that the client may potentially receive a large amount of notifications, which will exhaust the battery power of the client terminal, and again, precious bandwidth is occupied for the client's wireless connection with the client access network 102 over a limited radio interface. Such problems can be partly overcome by the client access network setting a minimum time period between successive notifications to the same client, a so-called "rate limitation". However, if the client really needs information in real-time, the rate limitation value must be set quite short such that the actual saving of notifications becomes insignificant.

In some known solutions, the client may also be requested to set a minimum time period between successive notifications, sometimes referred to as a "throttle time". Nevertheless, the client will inevitably receive user information also when not needed, or even without noticing, e.g. if the terminal is inaudible. Furthermore, in the prior solutions, the client access network must establish a separate subscription for each user that on the client has requested information for, even when several users belong to the same access domain, resulting in many inter-network messages for a single client subscription.

When providing requested information to a telecommunication client regarding a plurality of users, it is desirable to generally reduce the signalling activities, particularly over the critical radio interface, without imposing unwanted delays, in the process of delivering such information to the client.

SUMMARY OF THE INVENTION

The object of the present invention is to reduce or eliminate the problems outlined above. This object and others are obtained by providing a method and arrangement for providing information to a client from a client access network in the form of user information regarding a plurality of users. According to said method, a subscription request is first received from the client for certain information on a set of users, whereupon information updates regarding users in the set are received and stored. A subsequent request for user information is later received from the client, and stored user information is then retrieved corresponding to the requested information.

Finally, a notification is sent to the client regarding the retrieved user information, in response to the subsequent user information request. Typically, the users in the set are mobile users, and the user information may be presence information on the users.

If the users in the set are connected to other access networks, the client access network establishes a network subscription for user information updates with each of the other access networks to which users in the set are connected, in response to the received client subscription request.

If several of the users in the set are connected to the same user access network, the client access network may send one common subscription request for those users to that user access network, including a list of the users in the set being connected to that network.

Information updates may be continuously received from the other access networks whenever changes of state are detected for the users in the set, impacting the present network subscription.

After establishing the network subscriptions, information may be initially received from the other access networks on the current states of their respective users. An initial notification may then be sent to the client regarding the received user information, before receiving the subsequent user information request.

The subsequent request for user information received from the client may be limited to a subset of users comprising fewer users than the original set of users. The subsequent user information request may further be limited to one or only some types of information, out of the information types included in the subscription. The subset of users and/or types of information of interest in the subsequent request may be selected by the client, or may be adapted to a service and/or application currently utilised by the client.

A subsequent notification may be sent to the client indicating only the changes since the previous notification, or that nothing has changed since the last notification.

The subscription request from the client may indicate the types of information needed, as well as a time of expiration. The subscription request may further indicate a minimum time between successive notifications corresponding to the time of expiration.

The set of users may be selected by indicating a predetermined list of users, or as an ad hoc list of users. The set of users may further be selected by adding users to or deleting users from a predetermined list of users.

The present invention further embraces an arrangement in a client access network for providing information to a connected client in the form of information regarding a plurality of users. The arrangement comprises an information delivery server adapted to receive a subscription request from the client for information on a set of users, and to receive information updates regarding the set of users from their respective access networks. The arrangement further comprises a data storage means for storing updated user information. The information delivery server is further adapted to receive a subsequent request for user information from the client, and to retrieve requested user information from the data storage means and send a notification to the client including the retrieved user information, in response to the user information request.

If at least some of the users in the set are connected to other access networks, the information delivery server may further be adapted to establish a network subscription for user information updates with each of the other access networks to which users in the set are connected, in response to the received client subscription request.

The information delivery server may further be adapted to continuously receive information updates from the other access networks whenever changes of state are detected for the users in the set.

The information delivery server may further be adapted to initially receive from the other networks, information on the current states of their respective users. The information delivery server may further be adapted to send an initial notification to the client containing the received user information.

The information delivery server may further be adapted to send to the client a subsequent notification indicating only the changes since the previous notification.

The information delivery server may further be adapted to send to the client a subsequent notification indicating that nothing has changed since the last notification.

Furthermore, the arrangement may comprise a user list server adapted to maintain various lists of users defined for clients of the client access, and to provide a predetermined list as a basis for the selected set users.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Figure 1:
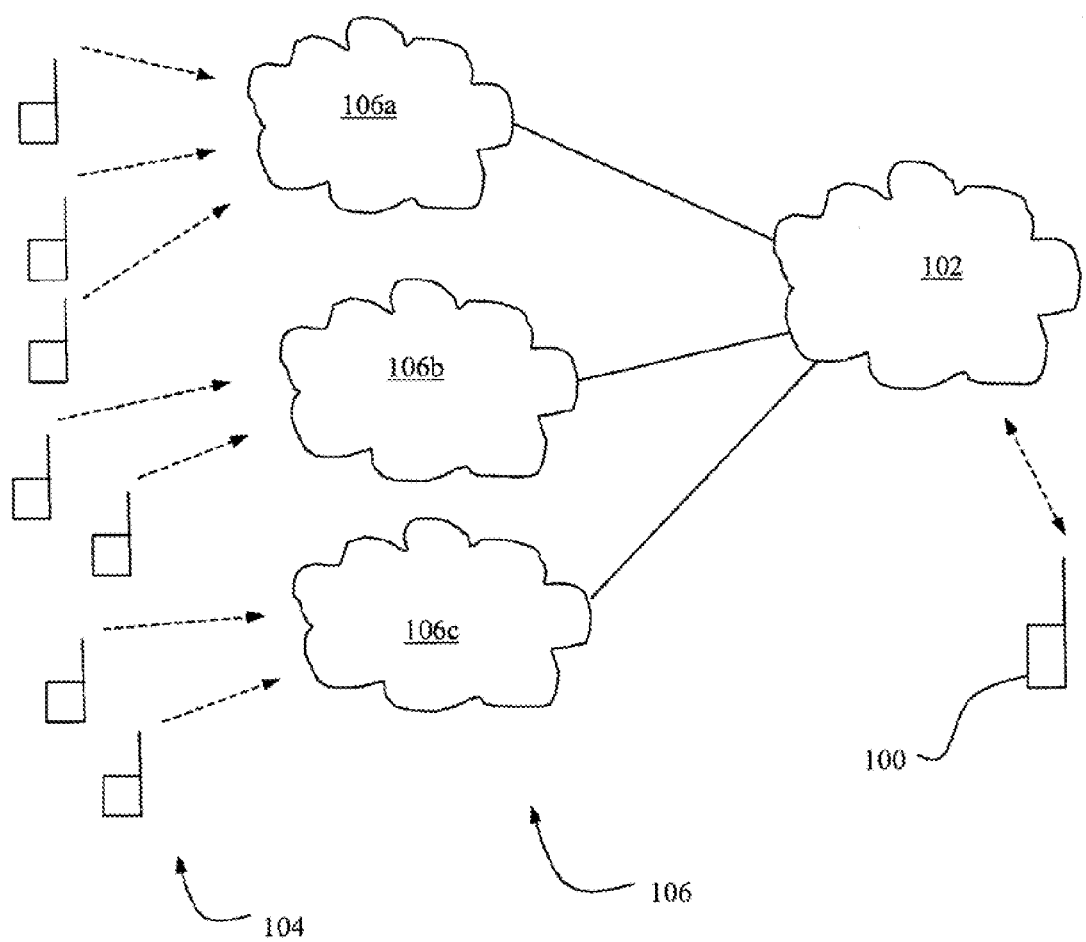
FIG. 1 is a schematic view of a typical communication scenario for providing information on users to a client, according to the prior art.
Figure 2:
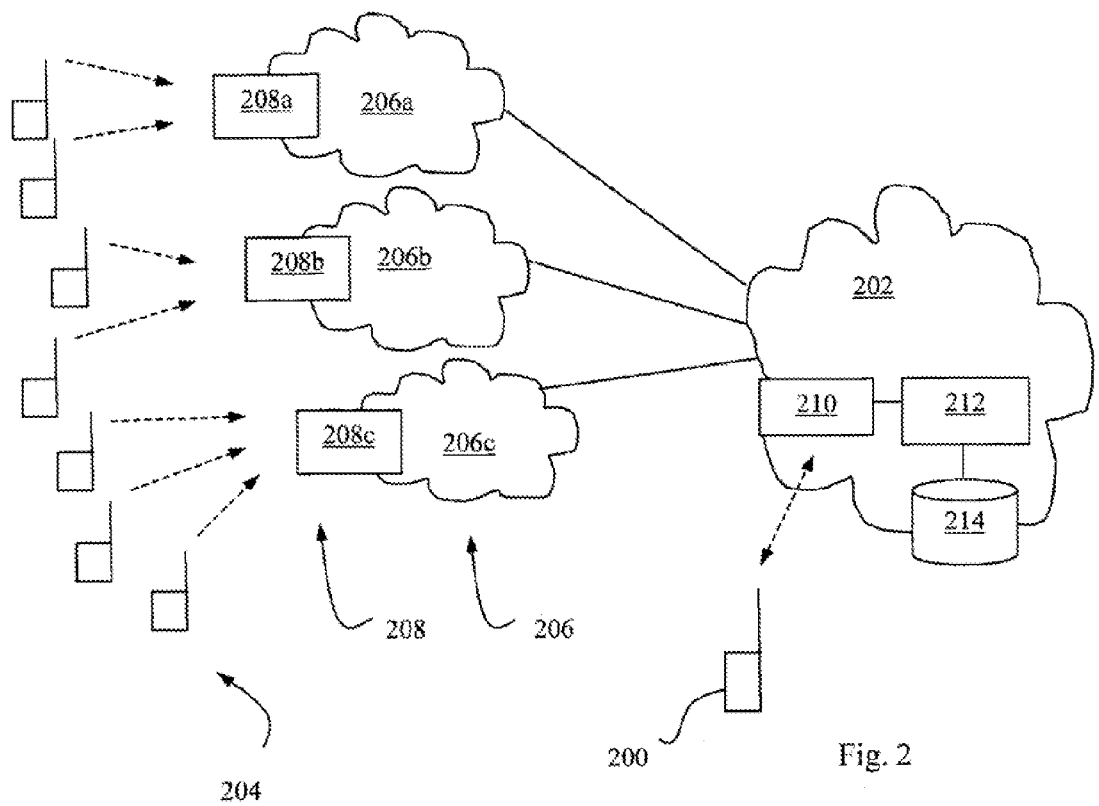
FIG. 2 is a schematic view of a communication scenario for providing information on users to a client, in accordance with one embodiment of the present solution.

A preferred embodiment of the present invention will now be described, initially with reference to FIG. 2. Similar to the communication scenario illustrated in FIG. 1, a client 200 is connected to a client access network 202 using a terminal capable of wireless communication. In this context, the term "client access network" should be broadly understood as any network capable of providing the below-described service to the client being currently connected thereto, and is not necessarily the network where the client has his/her permanent mobile subscription, i.e. the home network. The client access network 202 could also be a visited network, e.g. in a foreign country.

Also, a number of other mobile users 204 are connected to various further mobile access networks 206 in other domains. In this example, three such networks 206a-c are shown, although any number of networks and users may be involved in the present invention, typically many more than those illustrated here. A number of further mobile users 204, not shown, may also be connected to the client access network 202 which can be involved in the service described below, although not included here. It should be noted that the present invention is not limited to mobile users, but can be used for fixed users as well, or a mix of mobile and fixed users.

Each of the networks 202, 206 is adapted to generally provide updated user information to subscribing clients as requested, e.g. according to the above-described presence service by having an IMS network connected to each network. In this example, each of the networks 206a, 206b and 206c comprises a user data collecting unit 208a, 208b and 208c, respectively. Each unit 208a-c is adapted to detect changes of state for users, e.g. by receiving event publications, either from connected users 204 or by receiving information from the associated network itself, whenever a user changes his/her state, e.g. the presence data as exemplified above, in some predefined manner. The user data collecting units 208a-c are thus adapted to keep track on the states of the users 204, based on the received information. A corresponding user data collecting unit may of course be arranged in the client network 202 to collect user information from its connected users, although not specifically indicated in the figure.

For example, a network 206 may have a functionality of detecting the geographic position of a user, e.g. by means of GPS (Global Positioning System), or signal strength and/or signal delay measurements, which is stored in the associated user data collecting unit 208. Whenever the network detects a change in the user's position, the user data collecting unit will update the current position data for the user. In another example, a user may input a current personal mood in his/her terminal, such as "sad" or "happy", which is sent to the network and its user data collecting unit for update, and so forth.

The client access network 202 comprises an information delivery server 210 for providing information to the client 200 regarding a plurality of users, as desired by the client, by sending notifications to the client, to be described below. Of course, a corresponding information delivery server may be arranged in each of the networks 206, although not shown here. For example, the information delivery server may be integrated with a user data collecting unit in a single server or entity. In practice, the server 210 may be a Resource List Server (RLS) if an IMS network is implemented in the client access network 202, although the general term "information delivery server" will be used in this description to represent any possible network entity having the function described below. The user information in question may of course include any of the above-described types of presence data or similar, but is not limited thereto.

The server 210 is connected to a user list server 212, which in the IMS example is an entity called "Group List Management Server, GLMS". The user list server 212 is adapted to maintain various lists of users defined for clients of the client access network 202, such as phone books, contact groups or the like. The lists may further be divided into various sublists, e.g. depending on specific subjects and interests. The sublists may further be valid for specific services and/or applications. The user list server 212 is also connected to a user data storage means 214, hereafter called user database, for storing updated user information according to the lists, to be described below. The user database 214 may be implemented as a cache memory or the like. In practice, the above-described functional units 210, 212 and 214 may be incorporated into one common server unit.

Briefly described, the present solution allows the client to initially subscribe for selected state information on a set of users as defined by a user list, either predefined or ad hoc, during a limited and specified period of time. In response to such a subscription request from the client, the information delivery server 210 then establishes a subscription for user information with each network 206a-c to which the users in the set are connected. The associated user data collecting units 208a-c will then send updated user information to the information delivery server 210, whenever a user change his/her state or presence data in a way that impacts the user information of interest as selected by the client for the subscription.

In the present solution, however, the information delivery server 210 does not automatically send notifications to the client as soon as changes occur. In contrast to the previously used push behaviour, the updates received from the other networks are stored in the user database 214 for later retrieval, instead of being pushed to the client. Thus, received updated information is continuously collected in the user database 214 for the duration of the subscription.

When the client 200 really wants user information, he/she can send a subsequent data request to the information delivery server 210. In response to such a data request, relevant and updated data is retrieved from the user database according to the list as maintained in the user list server 212, and the data is then duly sent to the client 200. In this way, notifications will only be sent to the client when really needed and asked for, and the relevant information has already been collected in the database 214, ready to be promptly sent to the client upon request. Hence, the present solution is a combination of a push behaviour of the networks 206 to the client access network 202, and a pull behaviour of the client 200 from the client access network 202.

Figure 3:
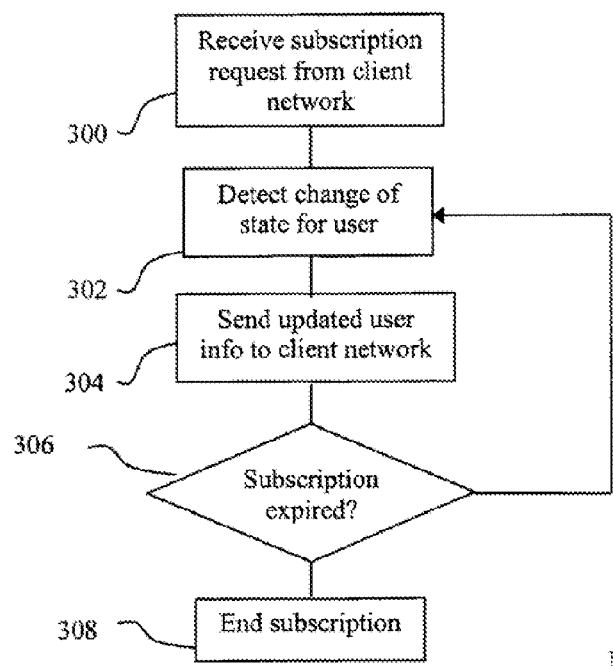
FIG. 3 is a flow chart illustrating a procedure for updating user information, which in known per se but can be utilised for the present solution.

FIG. 3 illustrates a flow chart of a procedure for updating user information during a subscription. As mentioned above, the information delivery server 210 establishes a network subscription with each network 206a-c to which the users in the set are connected, in response to receiving an initial subscription request from a client 200. The subscription request from the client may contain a specification of the particular users on which the client is interested to receive information, and also of what type of information the client wants to receive. The client may also indicate the duration of the subscription, e.g. specified as an expiry time. Alternatively, the subscription may be set to run for the time being, i.e. until the client indicates that is to be terminated, or may be limited by a default duration length if the client has not indicated a duration.

The client may indicate the set of users of interest by giving a mere reference to a predetermined list which is already known in the user list server 212.

Alternatively, the users may be individually specified in an ad hoc list given by the client, or users may be added to and/or deleted from a predetermined list.

The flow chart in FIG. 3 illustrates the procedure executed in a user data collecting unit 208 associated with one of the networks 206 to which one or more users in the set is/are connected. The client access network 202 first sends a network subscription request for information on one or more specific users belonging to the network 208 in question, in accordance with the client's request. Thus in a first step 300, a subscription request is received from the client access network 202 with the same expiry time as that specified by the client. From now on, the user data collecting unit 208 will send notifications to the client access network regarding the concerned user(s) whenever changes occur impacting the requested user information.

Next in a step 302, a change of state is detected for a user in the set, e.g. in a manner as described above, indicating that this particular user has changed his/her state, e.g. presence data, in some way that is relevant to the subscription. A notification is then sent from that user's access network to the client access network, containing updated user information indicating the detected change of the user, in a next step 304.

In this example, a step 306 is illustrated where it is determined whether the subscription with the client access network has expired. If not, steps 302 and 304 may be repeated whenever a user changes his/her state or presence data as relevant to the subscription. When the network subscription has finally expired, it is terminated in a step 308 and no more updates are sent to the client access network. Of course, an active step 306 of checking the expiration may not be necessary, as the subscription can be automatically terminated as soon the time has expired, or when the client indicates termination.

Figure 4:
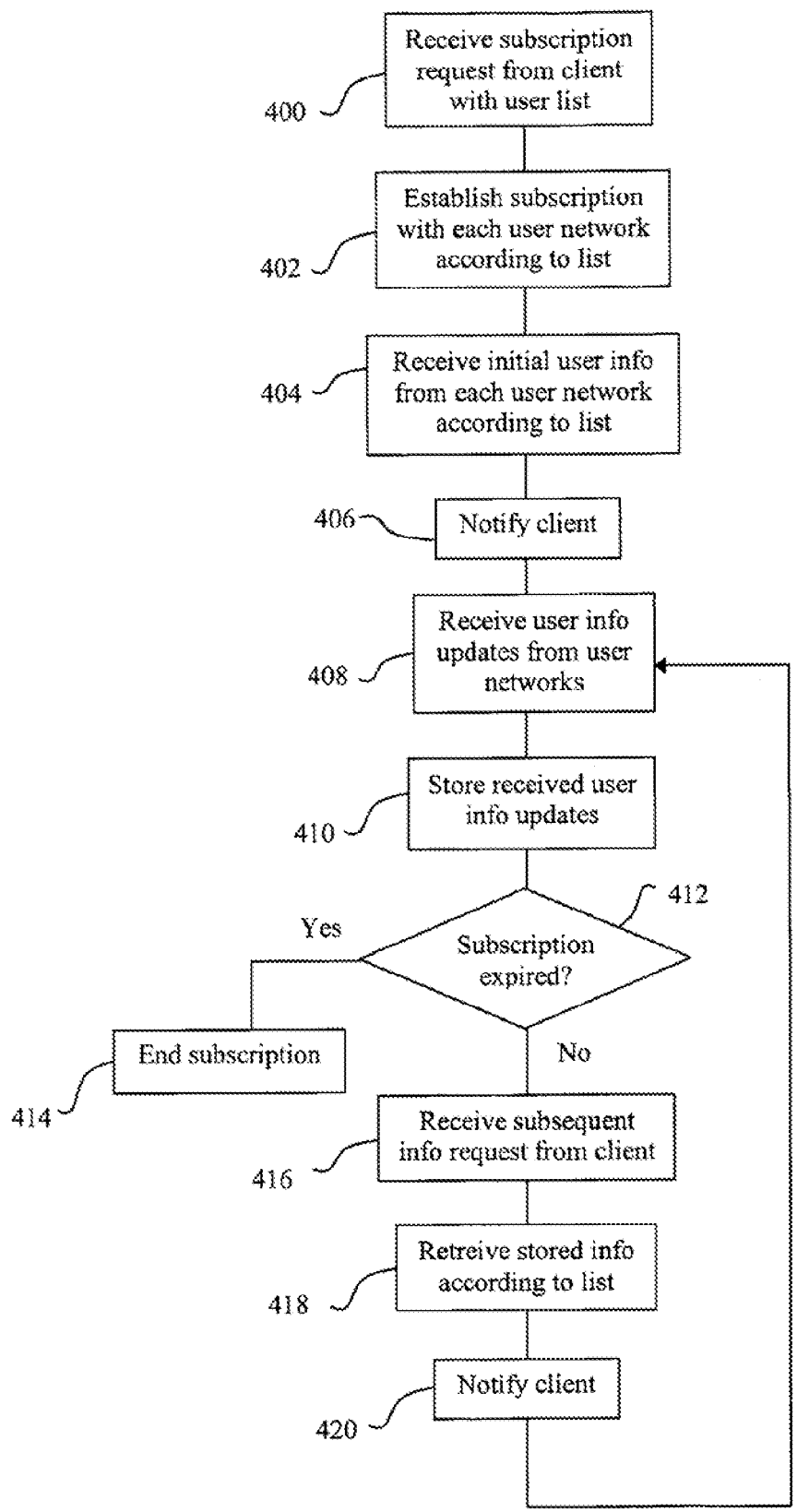
FIG. 4 is a flow chart illustrating a procedure for providing user information to a client, according to one embodiment of the present solution.

It should be noted that the updating procedure described in FIG. 3 is basically the same as previously used for a pure push behaviour, and is therefore not affected by the present solution. The inventive procedure of providing information to a client, as described below with reference to a preferred embodiment illustrated in FIG. 4, however utilises a pull mechanism between the client and the client access network. The following procedure is generally executed in the client access network 202, the active steps being mostly taken by the information delivery server 210 illustrated in FIG. 2.

In a first step 400, the client access network 202 receives a subscription request from the client 200 indicating a set of users 204, as described above, such that the client access network can identify the users, the wanted type(s) of user information and the duration of the client's requested subscription, e.g. by means of predetermined lists maintained by the user list server 212. The subscription duration may be determined in different ways, as exemplified in connection with FIG. 3.

From this information, the client access network can send corresponding subscription requests to the concerned networks 206 to which the users 204 are connected, and a network subscription is established accordingly with each network 206a-c, in a step 402, for information on users in the set connected to the networks, respectively. The network subscriptions may also be limited to specific types of information, as requested by the client, such as position only, or position and mood, etc. It should be noted that the user set of interest may well include users that are connected to the client access network as well.

In one embodiment, in the case when several of the users in the set are connected to the same network 206, the client access network preferably sends one common subscription request for information on those users to that network 206, including a list of the users in the set being connected to that network. This will result in a reduced amount of signalling as compared to sending a separate subscription request for each user to the same network 206. Hence, only one subscription request is preferably sent per domain in order to minimise the inter-network signalling.

Another benefit is that any throttling or rate-limiting functions for the subscription can be controlled per domain, instead of per user.

Once a subscription has been established with each network 206, the networks will initially send information on the current states of their respective users 204, which is received in a step 404. Next, the client access network 202 may send an initial notification to the client 200 containing the current states of the users of interest, according to the received information, in a step 406, assuming that the client is interested in the information immediately after having sent the subscription request. In this concept, and in the following, the term "notification" is intended to cover any type and/or combination of message (s) and/or indication (s) that can be utilised to convey this kind of information to the client. In an alternative embodiment, step 406 may however be omitted in order to avoid any unneeded notification not requested by the client. So far, a push behaviour has been used but from now on, after the initial data has been sent to the client, the client access network will not send any data unless the client asks for it, hence a pull behaviour.

According to the ongoing network subscriptions, the client access network receives from the networks 206 various updates on the user information relevant to the subscription, whenever the users change their states, as described in connection with FIG. 3, which is generally indicated in a next step 408. Each time such updated information is received, the client access network stores it in the user database 214, as indicated in a step 410. If users connected to the client access network are also included in the list, relevant updates on them can of course be handled internally by the client access network.

Next, a step 412 is illustrated for checking whether the client's subscription has expired or not, and if it has, the client subscription, as well as the associated network subscriptions having the same expiration time, are terminated in a step 414. However in practice, it is not necessary to perform this as a specific step at this point in the procedure, but this can of course be checked or watched more or less continuously throughout the procedure.

Next in the procedure, the client has decided to fetch updated information, and a subsequent information request is received from the client in a step 416. Typically, a certain amount of time has elapsed since the user information was initially sent in step 406, and some of the user information may have changed during this period.

In one embodiment, the subsequent information request received from the client may be limited to a subset of users comprising fewer users than the original set of users in the client's subscription. Furthermore, the subsequent information request may be limited to only one or some of the different types of information included in the subscription. For example, the requested subset of users and/or information type(s) may be adapted to a service and/or application currently utilised by the client. In this way, the client is free to request updated information for any selected users in the original set, or for any selected type(s) of user information of the subscription, depending on his/her current needs.

In response to the client's information request, the current updated version of the requested user information is retrieved from the user database 214, in a next step 418, which is then duly sent to the client in a notification, in a step 420. Retrieving relevant data from the user database in this way is a much faster procedure as compared to requesting and receiving the information from all of the concerned networks 206. The process may then move back to step 408 for receiving further updates from the networks 206, as in step 408, as well as any further subsequent information requests made by the client, as in step 416. In order to make the notifications to the client shorter and more efficient, a short indication of only the information changes since the last notification is preferably sent in the notification step 420, instead of the complete set of data. If nothing has changed since the last notification, a very short indication thereof may be sent. In this way, the size of the notification message (s) sent to the client may be less than full-sized and can be kept at a minimum, resulting in optimal use of precious bandwidth in the wireless interface.

By the combined push and pull mechanisms according to the present invention, a most efficient solution is obtained where a minimum of data amounts need to be transmitted between the client access network 202 and the other access networks 206, as well as between the client access network 202 and the client 200. In particular, the client access network does not have to fetch information from every network when information is requested by the client, but this information has already been received and stored continuously by means of the ongoing network subscriptions and is therefore immediately available from the user database.

Wanted information can also be conveyed to the client with a minimum of delays, i.e. the need for real-time information can be satisfied to a great extent. Moreover, this solution offers great flexibility for the client, since user information may be requested for any of the users in the originally subscribed set of users, depending on the client's current needs or on which service and/or application is utilised at the moment.

The above-described service can be accomplished by using existing messages and protocols, e.g. as currently being defined by the IETF specification RFC3265. In order not to receive unwanted notifications from the client access network, the client can then indicate a throttle time equal to the expiration time, such that no notifications will be issued, or pushed, automatically during the entire subscription, other than when occasionally requested, or pulled, by the client.

The present invention may be used in conjunction with existing services available from the IMS network, such as "Push-to-Talk over Cellular" (PoC), Instant Messaging and of course the above-described Presence service, etc. While the invention has been described with reference to specific exemplary embodiments, the description is only intended to illustrate the inventive concept and should not be taken as limiting the scope of the invention, which is defined by the appended claims.

The invention claimed is:

1. A method of providing information to a client from a client access network, the information being in the form of user information regarding a plurality of users, the method comprising the following steps, as executed in the client access network:
   - receiving a subscription request from the client for certain information on a set of users, wherein at least some of the users in the set are connected to other access networks;
   - establishing a network subscription for user information updates with each of the other access networks to which users in the set are connected, in response to the received client subscription request;
   - continuously receiving and storing information updates regarding users in the set from the other access networks whenever changes of state are detected for the users in the set;
   - receiving a subsequent request from the client for user information regarding users in the set of users;
   - retrieving stored user information corresponding to the requested information, wherein the user information was received from the other access networks according to the network subscriptions; and
   - sending a notification to the client regarding the retrieved user information, in response to the subsequent user information request.

2. The method according to claim 1, wherein the users are mobile users.

3. The method according to claim 1, wherein the user information is presence information on the users.

4. The method according to claim 1, wherein several of the users in the set are connected to the same user access network, and the client access network sends one common subscription request for those users to the user access network to which the several users are connected, wherein the one common subscription request includes a list of the users in the set being connected to the user access network.

5. The method according to claim 1, wherein information updates impacting the present network subscription are received.

6. The method according to claims 1, wherein, after establishing the network subscriptions, information is initially received from the other access networks on the current states of their respective users.

7. The method according to claim 6, wherein an initial notification is sent to the client regarding the received user information, before receiving the subsequent user information request.

8. The method according to claim 1, wherein the subsequent request for user information received from the client is limited to a subset of users comprising fewer users than the original set of users.

9. The method according to claim 1, wherein the subsequent request for user information received from the client is limited to one or some types of information of the information included in the subscription.

10. The method according to claim 9, characterized in that the subset of users and/or the types of information are selected by the client.

11. The method according to claim 9, characterized in that the subset of users and/or the types of information are adapted to a service and/or application currently utilized by the client.

12. The method according to claim 1, wherein a subsequent notification is sent to the client indicating only the changes since the previous notification.

13. The method according to claim 1, wherein a subsequent notification is sent to the client indicating that nothing has changed since the last notification.

14. The method according to claim 1, wherein the subscription request from the client indicates the types of information needed.

15. The method according to claim 1, wherein the subscription request from the client indicates a time of expiration.

16. The method according to claim 15, wherein the subscription request from the client specifies a minimum time between successive notifications corresponding to the time of expiration.

17. The method according to claim 1, wherein the set of users is selected by indicating a predetermined list of users.

18. The method according to claim 1, characterized in that the set of users is selected as an ad hoc list of users.

19. The method according to claim 1, characterized in that the set of users is selected by adding users to or deleting users from a predetermined list of users.

20. An arrangement in a client access network for providing information to a connected client in the form of information regarding a plurality of users, the arrangement comprising:
   - an information delivery server adapted to:
     - receive a subscription request from the client for certain information on a set of users, wherein at least some of the users in the set are connected to other access networks;
     - establish a network subscription for user information updates with each of the other access networks to which users in the set are connected, in response to the received client subscription request; and
     - continuously receive information updates regarding users in the set from their respective access networks whenever changes of state are detected for the users in the set; and
   - a data storage device for storing updated user information;
   - wherein the information delivery server is further adapted to:
     - receive a subsequent request from the client for user information regarding users in the set of users;
     - retrieve requested user information from the data storage means, wherein the user information was received from the other access networks according to the network subscriptions; and
     - send a notification to the client including the retrieved user information, in response to the user information request.

21. The arrangement according to claim 20, wherein the information delivery server is further adapted to initially receive from the other networks, information on the current states of their respective users.

22. The arrangement according to claim 21, wherein the information delivery server is further adapted to send an initial notification to the client containing the received user information.

23. The arrangement according to claim 20, wherein the information delivery server is further adapted to send to the client, a subsequent notification indicating only the changes since the previous notification.

24. The arrangement according to claim 20, wherein the information delivery server is further adapted to send to the client, a subsequent notification indicating that nothing has changed since the last notification.

25. The arrangement according to claim 20, further comprising a user list server adapted to maintain various lists of users defined for clients of the client access network, the user list server being adapted to provide a predetermined list as a basis for the selected set users.

* * * * *

UNITED STATES PATENT AND TRADEMARK OFFICE
CERTIFICATE OF CORRECTION

| | | |
|---|---|---|
| PATENT NO. | : 8,145,197 B2 | Page 1 of 1 |
| APPLICATION NO. | : 13/082610 | |
| DATED | : March 27, 2012 | |
| INVENTOR(S) | : Boberg et al. | |

It is certified that error appears in the above-identified patent and that said Letters Patent is hereby corrected as shown below:

On the Title Page:

Item (75), under "Inventors", in Column 1, Line 2, delete "Alvsjo" and insert -- Älvsjö --, therefor.

Item (75), under "Inventors", in Column 1, Line 4, delete "Alvsjo" and insert -- Älvsjö --, therefor.

In the Specifications:

In Column 1, Line 38, delete "CDMA" and insert -- WCDMA --, therefor.

In Column 6, Line 14, delete "DESCRIPTION" and insert -- DETAILED DESCRIPTION --, therefor.

In the Claims:

In Column 11, Line 51, in Claim 6, delete "claims" and insert -- claim --, therefor.

Signed and Sealed this
Third Day of July, 2012

David J. Kappos
*Director of the United States Patent and Trademark Office*